July 25, 1967 M. E. GERRY 3,332,319

SOUND SYNCHRONIZED PROJECTOR DEVICES

Filed June 28, 1965 2 Sheets-Sheet 1

INVENTOR.
Martin E. Gerry

INVENTOR.
Martin E. Gerry 3,332,319
SOUND SYNCHRONIZED PROJECTOR DEVICES
Martin E. Gerry, 13452 Winthrope St., Santa Ana, Calif. 92705
Filed June 28, 1965, Ser. No. 467,223
3 Claims. (Cl. 88—28)

ABSTRACT OF THE DISCLOSURE

Treated herein is an audio-visual apparatus containing sound-slide cartridges and automatic injection and ejection of these cartridges by a mechanism, and a means for automatically controlling the duration of injection time, playing time of the sound track, and projection time of the visual information as well as ejection of the cartridges on completion of the cycle.

The present invention relates to improved projector devices for optically projecting or photographing visual information and simultaneously reproducing or recording a sound track thereon, and to provide an automatic controller device by which the combined sound track and visual information may be sequentially programmed.

Particular advantages of the present invention are that it includes a sound reproduction cartridge having two adjacent coplanar compartments, having a long reproducing or recording time, and occupying a small volume of space. One compartment retains an endless magnetic tape or wire with sound track thereon, while the other compartment retains a photographic slide permanently held therein. The construction of the sound track means compartment is simple, and excepting for the tape or wire, the only moving part is a single roller. A tape guide separator panel permits the sound tape to store its entire length in zig-zag folds in the tape compartment without tangling, without interfering with moving parts, or without having to be stored or moved in folded form around corners. The zig-zag folds of tape not having to travel around bends or corners in folded form, avoids the undesirable packing of tape around bends or corners, thereby preventing and avoiding resistance to the smooth and uniform transportation of the tape, thereby assuring a smooth and constant rate of flow of tape past the record-reproduce head, thus assuring raliable reproduction or recording of the sound track with fidelity. Bunches of tape having to be stored or moved around bends or corners are undesirable because they tend to impede the smooth and uniform flow of of tape past the record-reproduce head due to the varying loads imposed upon the tape drive means by tape drag action, thereby slowing down the tape drive means or causing slipping of the tape drive means with respect to the tape. When the sound reproduction cartridge is used in a projector that stores a plurality of cartridges, the time delay between termination of one cartridge and the utility of another, is dependent only upon the speed with which the cartridges are withdrawn and replaced in a storage magazine. This sound-slide cartridge simplifies the structure of the projector in which it is used, with the attendant advantages of lower cost of manufacture, greater simplicity, and high reliability.

A further feature of the present invention is a stationary record-reproduce head mechanism mounted on a supporting plate so that the head mechanism adapts itself to and provides the proper pressure on the magnetic tape or wire for recording or reproducing of a sound track.

Another object of the present invention is to provide a single stationary motor whose capstan or roller at the end of the motor shaft adapts itself to an aperture in the cartridge for driving the sound track tape.

Still another object of the present invention is to provide a simple automatic cycle controller sequencer, which upon manually operating a push button, ejects the used cartridge stored in a magazine of a projector and injects the new cartridge, starts the recording or reproducing of a sound track on a magnetic tape or wire by starting a motor which moves the tape or wire past the record-reproduce head and stops the record-reproduce drive motor when the tape or wire is returned to its starting position, or if a sequencing switch is activated manually at the beginning of the automatic controller sequencer operation, to sequentially recycle new cartridges from the cartridge storage magazine in the projector, until all cartridges have been used or until the automatic sequencing switch is manually returned to its normal position.

A complete understanding of the invention may be obtained by a study of the following detailed description taken in conjunction with the accompanying drawings in which.

Figures 1, 4:
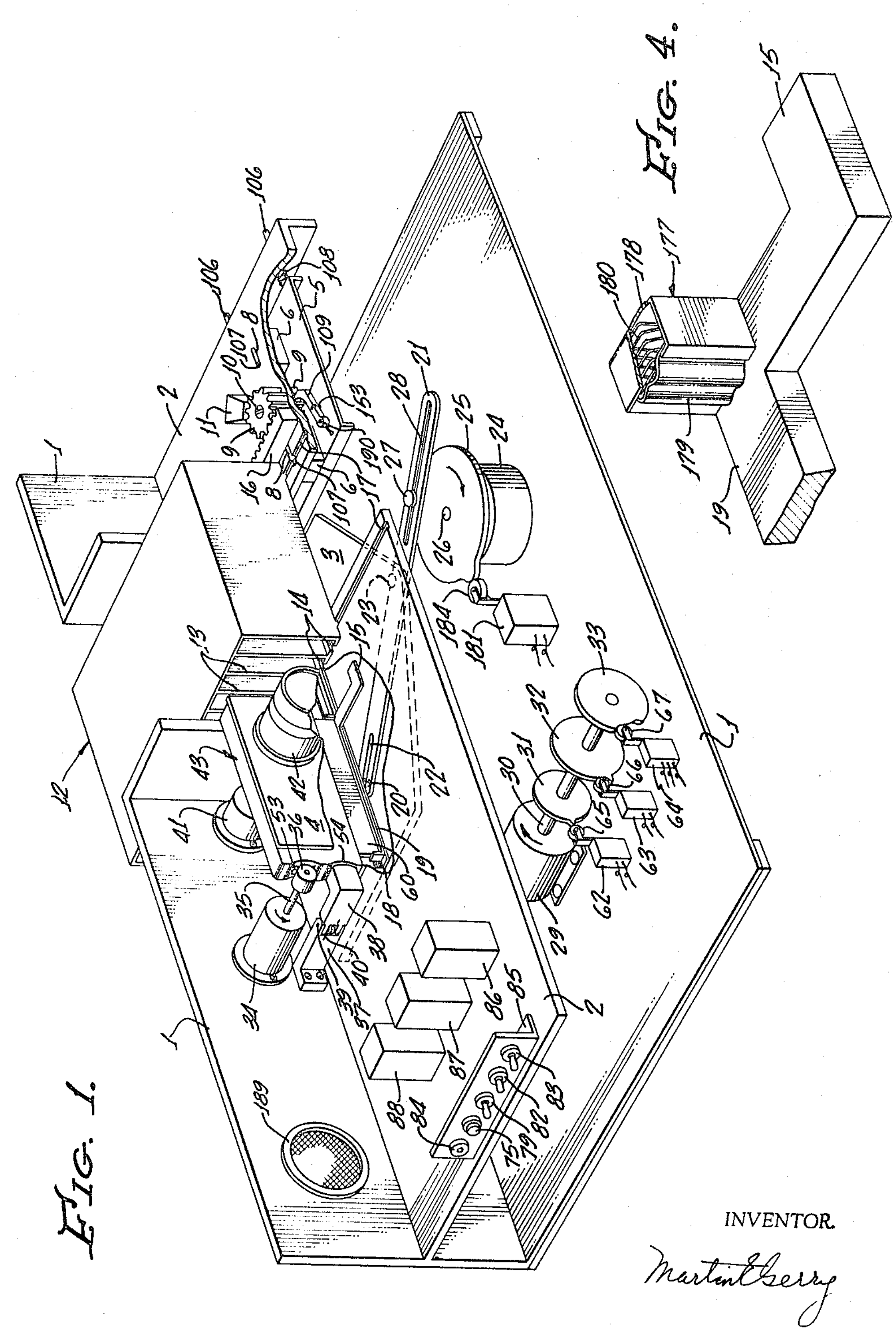
FIG. 1 is a perspective view partially in cross section, of a combination sound and slide projector embodying a sound and slide cartridge and an automatic controller sequencer in accordance with this invention.
FIG. 4 is a perspective view partially in cross section, of one of the vertical members of the C-bar cartridge transporter, showing the mechanism by which the cartridge is engaged and held, and also showing the index plate hammer.

*Main chassis support structure of sound-slide projector.*—Referring to FIG. 1, sub-assembly mounting plate 2 is mechanically affixed by screws or by welding to the vertical portion of main chassis support structure 1. This sub-assembly mounting plate 2 is rigidly supported by vertical columns (not shown) between the horizontal planes of structure 1 and mounting plate 2. C-bar support plate 3 is parallel to and located under plate 2 in the horizontal plane, and is mechanically affixed to main chassis structure 1 by means of screws or welding. Affixed by screws or other mechanical means to the vertical plane portion of main chassis 1, are loud speaker 189, record-reproduce drive motor 34, magnetic record-reproduce head mounting block 37, and projection lamp assembly 41. Affixed by screws or other mechanical means to the horizontal segment of main chassis support structure are cartridge injection motor 24 with cam 25 affixed mechanically to shaft 26, injection cycle microswitch 181, timing motor of automatic controller sequencer 29 with cams 31, 32, and 33 mounted on shaft 30 of timing motor 29, total cycle microswitch 62, injection cycle initiation microswitch 63, and record-reproduce cycle microswitch 64. The upper portion of the vertical members of the main chassis support structure 1 is split at the top and has two 90 degree bends which comprise a guide channel for guiding cartridge carrier magazine 12 during indexing operation.

*Sub-assembly mounting plate of sound-slide projector.*—Referring to FIGS. 1 and 8, sub-assembly mounting plate 2 holds and retains by means of screws or other mechanical means bracket 85, on which are mounted control switches 79, 82, and 83, push button 75, and microphone jack 84. Also held mechanically to sub-assembly mounting plate 2 are direct current power supply 86, modulator 87, amplifier 88, optical assembly mount and cartridge guide bracket 4, double index gear 9 held mechanically by screw 10, ball bearing index gear detent 11, cartridge carrier magazine 12, and indexing plate suspension screws 107 which mechanically hold index plate 5 and are free to move in slots 8 of sub-assembly mounting plate 2 and guide blocks 6, said guide blocks are welded to the underchassis of sub-assembly mounting plate 2. Index plate 5 has index plate guide pins 106 extending through index plate retract springs 108 and extending into holes provided in the vertical member of sub-assembly mounting plate 2. Double index gear 9, the lower segment mounted under the chassis of sub-assembly mounting plate 2 and extension of said lower segment of gear 9 extends through a hole in said mounting plate 2 to coaxially fit with the upper segment of said gear 9 inserted through a hole in said upper segment of gear 9 located on the upper side of sub-assembly mounting plate 2, and said upper and lower segments of gear 9 are both held together mechanically on said sub-assembly mounting plate 2 by means of screw 10. Cartridge carrier magazine 12 rides on the upper surface of sub-assembly mounting plate 2 in grooves 17. Said magazine 12 has a rack 16 mechanically affixed to its side, said rack 16 engages with index gear 9 for transporting said magazine 12. Said magazine 12 retains a plurality of cartridges 43 in compartments between panels 13. Cartridge guide extension 60 extends through a U-shaped slot in sub-asssembly mounting plate 2 when said cartridge 43 is in an injected position directly behind plate 4. The plurality of cartridges stored in magazine 12 between divider panels 13, extend their cartridge guide extensions 60 through slots 14 at the base of said magazine 12. Index plate 5, suspended by screws 107, said screws 107 extending through plate 2 and blocks 6 and threaded into tapped holes in plate 5, is free to move to the right when struck by index plate hammer 15. Index plate 5 has mounted thereon pawl 109. Leading edge of pawl 109 engages and cooperates with teeth of lower segment of index gear 9, is held to index plate 5 by a pivot pin 190 and held in tension between teeth of index gear 9 by spring 153, so that when the C-bar cartridge transporter 19 is translated to the right, the index plate hammer 15 cooperates with the vertical segment of index plate 5 causing index plate 5 to move to the right, moving pins 107 in slots 8 toward the right, compressing springs 108 and moving pins 106 to the right through guide holes in vertical portion of sub-assembly mounting plate 2, thereby causing pawl 109 to move index gear one notch, further motion being restrained by detent action of detent 11, and due to engagement of gear 9 with rack 16, magazine 12 advances one cartridge compartment. When the index hammer 15 ceases to cooperate with index plate 5, index plate 5 is returned to its normal position by index plate return springs 108, pawl 109 pivoting about pin 190 skirts arounds one tooth of index gear 9 and is repositioned into a groove between the next two teeth of index gear 9 by tension spring 153 action on pawl 109.

*Sound-slide cartridge transporting and positioning in sound-slide projector.*—Referring to FIGS. 1 and 8, C-bar support plate 3 is mounted in the horizontal plane parallel to and below sub-assembly mounting plate 2, and is affixed by screws or other mechanical means to the vertical portion of main chassis support structure 1. Mounted thereon are C-bar guide bracket 18 which prevents rotation of C-bar cartridge transporter 19 and hence prevents rotation of sound-slide cartridge 43 transported thereby between cartridge carrier magazine 12 and its injected position in the said projector behind bracket 4. Bracket 18 is slotted along its entire length so that C-bar extension pivot pin 20 may cooperate with and move in this slot when guided by and cooperating with slot 22 of slidebar 21 into which said pivot pin 20 extends. Sub-assembly mounting plate 2 has a U-shaped slot parallel to and aligned with the slot in bracket 18 through which extension 60 of cartridge 43 extends and engages cooperatively with cartridge guide ridged inserts 179 of C-bar cartridge tension assemblies 177 of C-bar cartridge transporter 19. These assemblies 177 apply tension to movable ridged inserts 179 via flat springs 180 and both inserts 179 and springs 180 are held in place by channels 178. Slidebar 21 is suspended from C-bar support plate 3 by pivot pin 23 and engaged cooperatively with injector motor cam pivot pin 27 in slot 28 of slidebar 21. Said slidebar 21 pivots about pin 23 due to clockwise rotation of cam 25 which is coupled to shaft 26 of motor 24 mechanically, being rotated due to the fact that motor 24 had been electrically energized, thereby translating the sound-slide cartridge 43 from its position directly at the rear of bracket 4 to its retaining section between cartridge carrier magazine dividing panels 13, being positioned so that extension 60 extends through slot 14 in said carrier magazine 12. Translatory motion of sound-slide cartridge 43 simultaneously with translatory motion of C-bar cartridge transporter 19, will result in sound-slide cartridge guide extension 60 being moved from the U-shaped slot in plate 2 into slots 14 upon completion of 180 degree rotation of cam 25, and due to indexing action as hereinabove described, which will occur at this time thereby advancing cartridge carrier magazine 12, which action will release the cartridge just returned to magazine 12 and engage the next new cartridge, and inject the new cartridge into the projector directly behind bracket 4 due to completion of 360 degrees rotation of cam 25, causing the return action of the combination of cam 25 to its initial position in combination with slidebar 21, pivot pin 23, C-bar extension pivot pin 20 in slot 22, and injector motor cam pivot pin 27 in slot 28.

Figure 2:
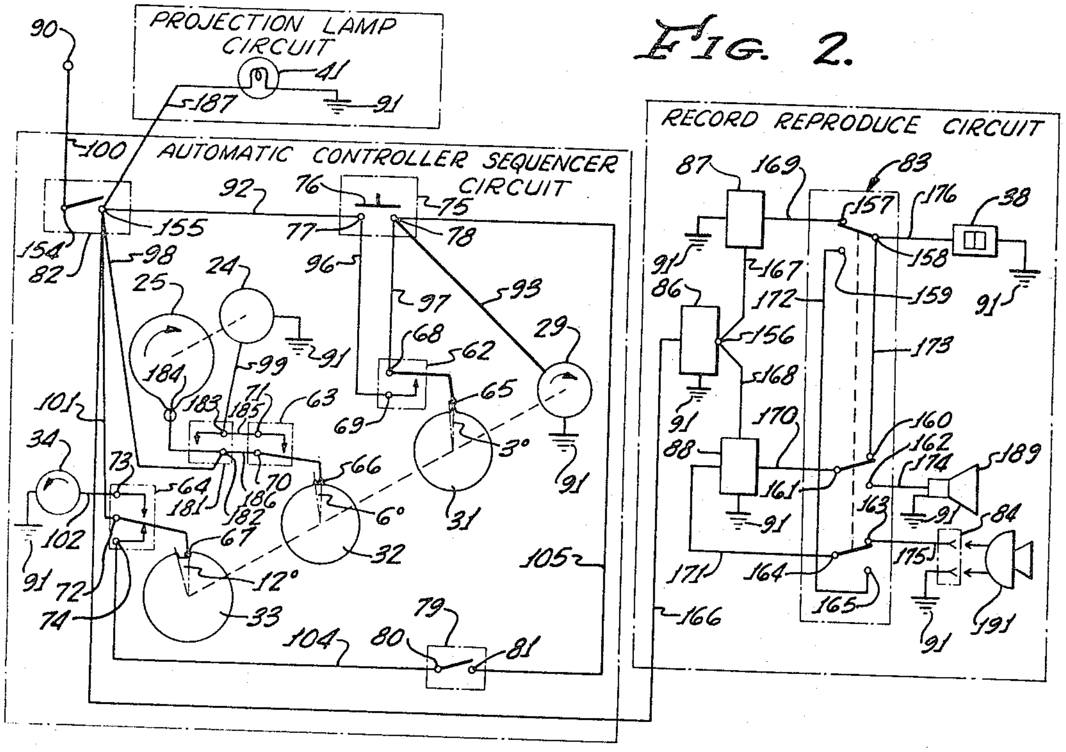
FIG. 2 is a schematic diagram of the automatic controller sequencer which provides the proper timing control for the various phases of the entire record-reproduce cycle of the sound-slide projector including individual cartridge cycling or sequential cyling of a plurality of cartridges. This figure also shows the projector lamp circuit and the record-reproduce circuit.

*Structural relationship of the automatic controller sequencer components.*—Referring to FIGS. 1 and 2, the automatic controller sequencer is comprised of main power switch 82, sequential cartridge programming switch 79, start cycle push button 75, timing motor 29 together with total cycle timing cam 31 cooperating with roller 65 of total cycle microswitch 62, injection cycle initiation cam 32 cooperating with roller 66 of injection cycle initiation microswitch 63, record-reproduce cycle timing cam 33 cooperating with roller 67 of record-reproduce cycle microswitch 64, said cams 31, 32, and 33 being keyed and mounted on a fluted shaft 30 of motor 29 and properly phased with respect to each other. In the normally unoperated condition of motor 29, the high portion of cam 31 cooperates with roller 65 of microswitch 62, and upon 3 degrees of clockwise rotation of cam 31 roller 65 is caused to cooperate with the low portion of said cam 31 thereby operating microswitch 62, and microswitch 62 remains operated until substantially 360 degrees of cam 31 rotation is completed. In the normally unoperated condition of motor 29, the low portion of cam 32 cooperates with roller 66 of microswitch 63, and upon 6 degrees of clockwise rotation of cam 32 roller 66 is caused to cooperate with the high portion of cam 32 thereby operating microswitch 63, and microswitch 63 remains operated for about 3 degrees of cam 32 rotation after which microswitch 63 is returned to its normal unoperated position for the remainder of the 360 degrees of cam 32 rotation. In the normally unoperated condition of motor 29, the low portion of cam 33 cooperates with roller 67 of microswitch 64, and upon 12 degrees of clockwise rotation of cam 33, roller 67 is caused to cooperate with the high portion of cam 33 causing microswitch 64 to be operated and remain operated for the remainder of the 360 degrees of cam 33 rotation. As stated above, each of the three timing cams 31, 32, and 33, have specific motion communication angles which they impart to their respective microswitch follower rollers to obtain mechanical activation of the said microswitches during the said respective angles. Inasmuch as the cams are keyed at their axes of rotation and motor shaft 30 is fluted to correspond with the keyways in the said cams, the timing cycle relationship may be changed between the cams by phasing the cams in any number of ways. The high portion of cam 25 normally cooperates with roller 184 of injector microswitch 181. Cam 25 is mounted mechanically on shaft 26 of injector motor 24. Cam 32 and microswitch 63 control the start of motor 24. Upon activation of microswitch 63 by cam 32, power is momentarily applied to motor 24 which starts to rotate thereby enabling motor 24 to transfer and maintain power to itself for the duration of 360 degrees of cam 25 rotation due to cooperation of cam 25 and roller 184 of microswitch 181 sustaining power to injection motor 24 until completion of injection cycle. The transfer of power occurs between microswitch 63 and microswitch 181 during the injection cycle. Operation of the automatic controller sequencer will be explained subsequently. It should be noted that the rotational speed of motor 29 is substantially slower than that of motor 24, and consequently once rotation of motor 24 is started by the automatic controller sequencer, the injection cycle control is taken over by motor 24 quite rapidly.

*Electrical relationship of the automatic controller sequencer components.*—Referring to FIG. 2, the electrical schematic diagram of the automatic controller sequencer is comprised of alternating current input power means 90 which is electrically connected to movable contact 154 of switch 82 by means of wire 100. Stationary contact 155 of main power switch 82 is electrically connected to stationary contact 77 of push button 75 by means of wire 96. Stationary contact 78 of push button 75 is electrically connected to the input side of motor 29 by means of wire 93 and return side of said motor 29 is electrically connected to common return 91. Stationary contact 77 of push button 75 is electrically connected to stationary contact 69 of microswitch 62 by means of wire 96. Stationary contact 78 of push button 75 is electrically connected to movable contact 68 of microswitch 62 by means of wire 97. Stationary contact 155 of main power switch 82 is electrically connected to movable contact 182 of microswitch 181 by means of wire 98. Movable contact 182 is electrically connected to movable contact 70 of microswitch 63 by means of wire 186. Stationary contact 183 of microswitch 181 is electrically connected to stationary contact 71 of microswitch 63 by means of wire 185. Stationary contact 183 of microswitch 181 is electrically connected to the input terminal of motor 24 by means of wire 99 and the return terminal of motor 24 is electrically connected to common return 91. Stationary contact 155 of main power switch 82 is electrically connected to movable contact 72 of microswitch 64 by means of wire 101. Normally open stationary contact 73 is electrically connected to input terminal of motor 34 by means of wire 102 while return terminal of motor 34 is electrically connected to common return 91. Normally closed contact 74 cooperating with contact 72 of microswitch 64 is electrically connected to normally open movable contact 80 of switch 79 by means of wire 104, and stationary contact 81 of switch 79 is electrically connected to stationary contact 78 of push button 75 by means of wire 105.

*Operational relationship of the automatic controller sequencer components.*—Referring to FIGS. 1, 2, and 3, the automatic controller sequencer operation can now be described as follows: alternating current power is applied from power means 90 and common power return means 91 by manually operating main power switch 82 which causes contact 154 to cooperate with contact 155 thereby enabling and distributing power to the controller sequencer. When push button 75 is manually momentarily depressed, contactor 76 cooperates with contacts 77 and 78 thereby momentarily applying power to timing motor 29 which begins to rotate in a clockwise direction. After cam 31, mounted on shaft of motor 29, rotates 3 degrees the roller of microswitch 62 is repositioned on the low portion of cam 31 causing contacts 68 and 69 to cooperate with each other and supply power to motor 29 until said motor 29 has completed 360 degrees of rotation. At 6 degrees of rotation of motor 29, roller 66 of microswitch 63 is positioned on the high portion of cam 32 causing contacts 70 and 71 to cooperate with each other momentarily and applying power means to motor 24 which starts to rotate rapidly performing the cartridge injection operation and causing the high portion of cam 25 cooperating with roller 184 of microswitch 181 to move off the high portion on to the low portion of cam 25 and cause cooperation of contacts 182 and 183 which take over control from contacts 70 and 71 and apply power from power means to motor 24 until 360 degrees of rotation of motor 24 has been completed, causing cooperation of roller 184 with high portion of cam 25 which interrupts cooperating contacts 182 and 183 so they no longer cooperate with each other, thereby removing power from motor 24 and completing the injection-ejection operation of cartridge 43. Upon completion of 12 degrees of rotation of motor 29, roller 67 of microswitch 64 moves off the low portion of cam 33 on to the high portion of cam 33, thereby causing contacts 72 and 73 to cooperate with each other which apply power from power means to tape drive motor 34. Tape drive motor 34 rotates in a counterclockwise direction for the remainder of the 360 degrees of rotation of motor 29 which has a capstan or cylindrical friction roller 36 mounted on the end of shaft 35, said capstan 36 nesting in tape drive aperture 53 of injected cartridge 43 makes contact and cooperates with tape 55 which is backed by roller 47 rotating on pin 48. Endless tape 55 is translated upward in cartridge compartment 44 and is folded and stored in a zig-zag fashion in compartment 44 between tape guide separator 49 and compartment separator wall 94. The tape 55 is further guided under tape guide separator 49 around tape guide cylinder 50 through apertures 54 and 53. The tape guide cylinder 50 also serves as a retainer insert to hold cover pin 103. At the end of 360 degrees of rotation of cam 33 roller 67 again cooperates with the low portion of said cam 33 causing contacts 72 and 73 to cease cooperating and removing power means from motor 34, stopping motor 34 and thereby stopping tape 55 at its exact starting point. Tape 55 is made just long enough to correspond with the timing cycle. For example, if the total timing cycle is 60 seconds and the tape drive starts to translate the tape after 12 degrees of cam 33 rotation, and 12 degrees is equal to 2 seconds, 58 seconds of tape recording or reproducing will remain in the timing cycle. If capstan 36 translates the tape at the rate of one foot per second, exactly 58 feet of tape would have to be provided to attain starting and stopping of the tape at exactly the same location in the tape loop. Motor 24 as well as motor 29 would both have to be of the synchronous type in order to maintain reliable timing drive and to guarantee the same start-stop tape location. Other combinations of motor and tape speeds as well as timing angles for the several cams are of course possible.

Upon injection of cartridge 43 as above described, record-reproduce head 38 swiveling about pivot pin 39, aligns itself with tape 55 in the record-reproduce aperture 54. Tension spring 40 provides proper tension of the head 38 against surface of tape 55 so that head 38 cooperates with and is tangential to tape 55 recording surface in aperture 54 for reliable high fidelity recording or reproducing of a sound track on the magnetic surface of tape 55.

When automatic sequential cartridge feed from magazine 12 is desired, normally open sequential cartridge programming switch 79 is manually closed once, so that contacts 80 and 81 cooperate with each other. If power had been provided by manually operating switch 82 so that contacts 154 and 155 cooperate with each other, power would be distributed to timing motor 29 which would continue sequential cycling for each injected cartridge as hereinabove described. But instead of stopping the sequence until the next time push button 75 is manually depressed, power will be automatically provided by virtue of cam 33 coming to a momentary stop wherein the low portion of cam 33 cooperates with roller 67, contacts 72 and 74 of microswitch 64 again cooperate with each other providing power to timing motor 29, thereby automatically ejecting the used cartridge and injecting a new cartridge, until all cartridges have been exhausted from magazine 12, or until switch 79 is manually restored to its normal electrically disconnected position wherein contacts 80 and 81 cease to cooperate with each other.

*Projection Lamp and Record-Reproduce Circuits.*—Referring to FIGS. 1 and 2, the projection lamp is electrically connected from contact 155 of the main power switch 82 by means of wire 187 to the input terminal of projection lamp 41 and the return terminal of projection lamp 41 is electrically connected to common power return means 91, so that when power switch 82 is manually operated so that contacts 154 and 155 cooperate with each other, power is applied to said projection lamp 41, so that when cartridge 43 is injected into the projector apparatus and is aligned with a window in said cartridge 43 containing a slide with visual information, the projection lamp 41 provides the required illumination for projection of the visual information through optical lens assembly 42 on to a screen external to the projector apparatus.

The record-reproduce circuit is conventional magnetic record-reproduce circuit. FIG. 2 shows switch 83 in its normal record mode position. In either the record mode or the reproduce mode, alternating current power is applied to direct current power supply 86 by means of wire 166 electrically connecting contact 155 of main power switch 82 to the input side of power supply 86, the return side of power supply 86 being electrically connected to the common power and signal return means 91. Direct current power is available at terminal 156 of power supply 86, being distributed to the input of modulator 87 by means of wire 167 and returned to common power and signal return means 91, and direct current power is also distributed to amplifier 88 by means of wire 168 and returned to common power and signal return 91. In the normal position of switch 83, recording of sound track occurs by virtue of microphone 191 being electrically connected to and cooperating with jack 84, electrically connects said microphone 191 through wire 175 to switch contact 163. Switch contact 163 cooperates with movable contact 164 providing electrical connection by means of wire 171 to the input of amplifier 88. The output of amplifier 88 is electrically connected by means of wire 170 to movable contact 161 which cooperates with stationary contact 160 which is electrically connected by wire 173 to movable contact 158 which cooperates with stationary contact 157 thereby providing a radio frequency bias signal from modulator 87 through wires 169 and 176 to record-reproduce head 38 at the same time as the sound track signal is also supplied through wire 176 to record-reproduce head 38. Signal return path is provided between return of head 38 and common power and signal return means 91, while signal return path is also provided by making an electrical connection between return of microphone jack 84 and common power and signal return means 91.

With direct current power applied as heretofore described, and with common power and signal returns remaining the same as hereinabove described, and the record-reproduce switch manually operated so that the switch is no longer in the normal record position but is in the other or reproduce position, the reproduce circuit is described as follows: Signal from the record-reproduce head 38 is electrically connected by means of wire 176 to movable contact 158 which cooperates with stationary contact 159, said stationary contact 159 is electrically connected to stationary contact 165 which cooperates with movable contact 164 to provide an electrical reproducing signal to the input of amplifier 88 by means of wire 171. Amplifier 88 provides amplified electrical signals through wire 170 to movable contact 161 which cooperates with stationary contact 162, thereby providing an electrical input by means of wire 174 to the input side of loudspeaker 189, the return signal path from loudspeaker 189 is connected to the common power and signal return means 91. The return signal path from record-reproduce head 38 is also electrically connected to the common power and signal return means 91.

Figure 3:
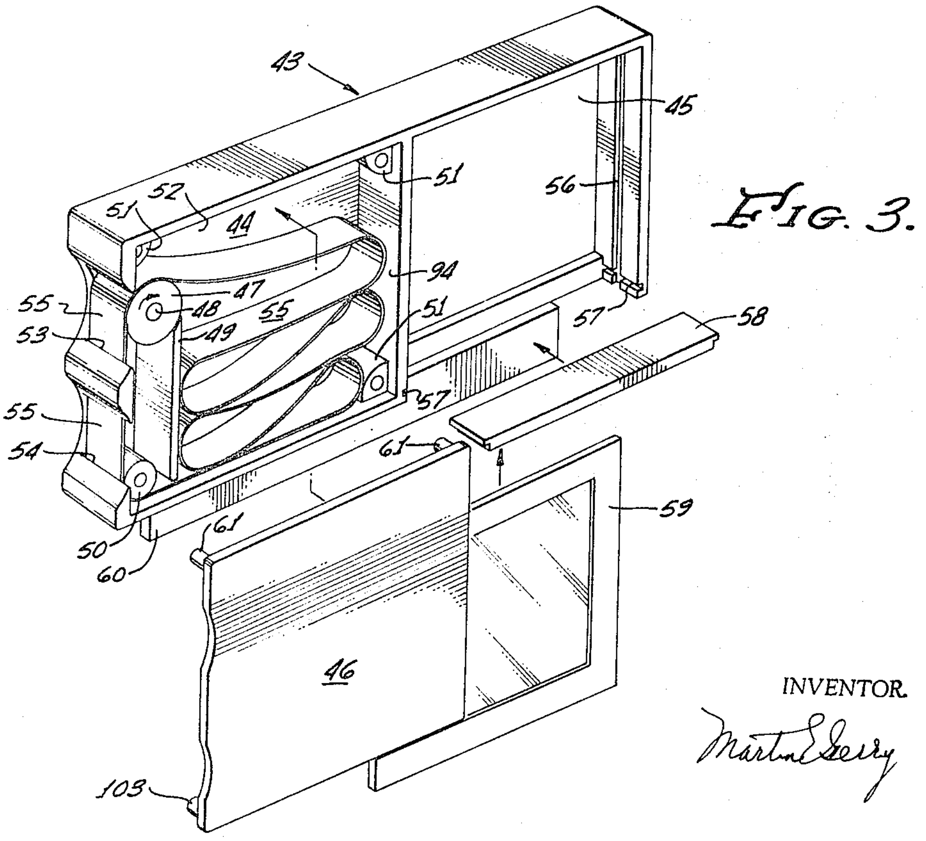
FIG. 3 is a perspective view of a sound-slide cartridge having two adjacent coplanar compartments and forming an embodiment of the invention.

*Sound-slide cartridge.*—Referring to FIGS. 1 and 3, the sound-slide cartridge is comprised of a case whose smallest dimension is its depth, and whose height is of a larger dimension than the depth, and the width is of a dimension larger than the height. The cartridge width is divided by a separator panel 94 which forms two compartments 44 and 45. The height and width of said cartridge 43, form a face of the cartridge and hence the faces of both compartments 44 and 45 which are located in the same plane. Also included as an integral part of cartridge 43 is guide extension 60 for automatically guiding and transporting cartridge 43 from a storage magazine 12 in a projector to its operating position, and thence returning the used cartridge into the cartridge storage magazine by means of a cartridge transporter mechanism hereinabove described, and an endless tape 55, a cover 46 for tape compartment 44, a slide 59, and a slide retainer panel 58.

Compartment 44 has a wall 52, capstan recessed aperture 53 and record-reproduce head recessed aperture 54 on the vertical edge of compartment 44 through which apertures is transported an endless tape 55 which is slightly narrower in width than the portion of depth of compartment 44 from the inner side of wall 52 to the inner side of cover 46, when said cover 46 is positioned in compartment 44 to close said compartment 44. Pins 61 and pin 103 molded to cover 46 fit into holes of molded inserts 51 and 50 respectively and are mechanically retained in said holes by pin and hole surface friction. The tape 55 travels around cylindrical guide insert 50 which is molded to the inner surface of wall 52, and travels around backing roller 47 rotatable on pin 48. Inserts 51 and 50 are recessed in compartment 44 to enable cover 46 to fit flush with case of cartridge 43. Panel 49 used for guiding tape 55 and serving as one wall of storage area for tape 55 is molded integrally to wall 52, so that the only edge of panel 49 attached is the one attached to wall 52. Panel 49 is positioned in a vertical plane parallel to separator panel 94. Tape 55 passes under the lower extremity or edge of panel 49 which edge is arced to smoothly guide tape 55 and passes around guiding cylinder insert 50, through aperture 54 cooperating with record-reproduce head 38 to record or reproduce a sound track. Tape 55 is further transported through aperture 53 between capstan 36 and backing roller 47, said capstan 36 being rotated counterclockwise by motor 34 and said backing roller 47 being rotated by capstan in a clockwise direction about pin 48 to transport tape 55 from the bottom to the top of compartment 44, laying the said tape 55 in portion of compartment 44 between panel 49 and compartment separator 94 in a folded zig-zag manner. The upper edge of panel 49 is angled acutely with respect to the vertical portion of the cartridge case in which apertures 53 and 54 are located, so that the angled edge of panel 49 occupies a length equal to a portion of an arc of the circumference of roller 47, the angled upper edge of panel 49 being positioned at the one-third roller 47 diameter as measured from the lower edge of roller 47, and positioned close to roller 47 so that any portion of tape 55 transported and layed into aforementioned storage section of compartment 44, will lay in freely without interfering with rotating roller 47. Tape 55 will not be able to be injected between roller 47 and angled edge of panel 49, and thereby reliable transportation of tape 55 into its storage section and laying in uniformly and neatly in a zig-zag series of loops is assured. Tape 55 in the preferred embodiment is of a plastic based magnetic coated type, but may also be photographic, metallic ribbon, thermosensitive paper or other material, magnetic wire, plastic ribbon for embossed or engraved sound track, or any ribbon whose base material is coated with a photo-electric or photo-sensitive material.

Compartment 45 is separated from compartment 44 by vertical separator panel 94 and comprises a window which has two grooves 56 in the vertical portion of the frame of the window for inserting slide 59 which is retained permanently therein by inserting horizontal panel 58 in two grooves 57 at right angles to grooves 56, forming a base or sill at the bottom of said window. Slide 59 contains visual information such as photographic slides, but may contain photographic positives or any other type of visual information.

I claim:

1. In an apparatus for optically projecting visual information, recording sound on a sound track, and reproducing said sound from said sound track, a sound-slide cartridge in combination with an automatic controller sequencer, where the said sound-slide cartridge is comprised of a depth of small dimension, a height of larger dimension, and a width of largest dimension, said width of largest dimension is divided into two compartments by a divider panel which is an integral portion of said cartridge, said height and width dimensions describe the face of said cartridge, and hence the faces of the said two compartments, which are coplanar with each other, one of the said two compartments comprises a section for storing said sound track means and a section through which is transported said sound track means, said sound track means is endless, one of the said two compartments has a recessed aperture adapted for cooperation with a record-reproduce head, and another recessed aperture for cooperation with a capstan for transporting said sound track means through said both recessed apertures, and a guiding means for said sound track means to guide and support said sound track means during transportation of said sound track means through said recessed apertures, the other of the said two compartments comprises a window for supporting a visual information slide therein, and said sound-slide cartridge has as an integral part thereof, an extension, for use in conjunction with an automatic cartridge injection mechanism, and in conjunction with an automatically indexed cartridge storage magazine, and the said automatic controller sequencer comprises a timing motor with three timing cams mounted on a common shaft, each of said three cams cooperating with a separate follower roller associated with each of the three individual microswitches; and a cartridge injection motor with a cam mounted on its shaft, said cam cooperating with a follower roller associated with a fourth microswitch; and a push button for cycling said sound-slide cartridges individually; and a switch for enabling automatic sequencing of a plurality of cartridges retained in said cartridge storage and indexing magazine in said apparatus.

2. The automatic controller sequencer as in claim 1 wherein said three timing cams have specific motion communication angles with respect to each microswitch follower roller; and said three timing cams are positionable with respect to each other, so that the motion communication angles may be phased in a plural number of ways; and the first of the said three timing cams and its cooperating microswitch controls the said timing motor and hence the total timing cycle; and the second of the said there timing cams and its cooperating microswitch controls the initiation of the cartridge injection cycle; and the third of the said three timing cams and its cooperating microswitch controls the sound track record-reproduce cycle; and the said cartridge injection motor, associated cam, and cooperating said fourth microswitch in combination, control the cartridge injection cycle.

3. The third of the said three timing cams and its cooperating microswitch as in claim 2, in combination with a sound track means drive motor for transporting said sound track means.

References Cited

UNITED STATES PATENTS

| | | | |
|---|---|---|---|
| 3,141,374 | 7/1964 | Berry | 88—28 |
| 3,256,775 | 6/1966 | Hall | 88—28 |

NORTON ANSHER, *Primary Examiner.*

RICHARD M. SHEER, *Assistant Examiner.*